United States Patent
Yasui

(10) Patent No.: US 9,239,463 B2
(45) Date of Patent: Jan. 19, 2016

(54) ILLUMINATION DEVICE AND DISPLAY UNIT FOR SUPPRESSING LUMINANCE UNEVENNESS AND INTERFERENCE PATTERN

(75) Inventor: Toshifumi Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 881 days.

(21) Appl. No.: 13/425,022

(22) Filed: Mar. 20, 2012

(65) Prior Publication Data

US 2012/0249918 A1 Oct. 4, 2012

(30) Foreign Application Priority Data

Apr. 4, 2011 (JP) .................................. 2011-082888
Jul. 13, 2011 (JP) .................................. 2011-154593

(51) Int. Cl.

| | | |
|---|---|---|
| G03B 21/20 | (2006.01) | |
| G02B 27/14 | (2006.01) | |
| G02B 27/48 | (2006.01) | |
| H04N 9/31 | (2006.01) | |
| G02B 27/09 | (2006.01) | |
| G02B 27/10 | (2006.01) | |
| G02B 27/42 | (2006.01) | |
| G02B 5/04 | (2006.01) | |

(52) U.S. Cl.
CPC .......... *G02B 27/141* (2013.01); *G02B 27/0927* (2013.01); *G02B 27/1033* (2013.01); *G02B 27/425* (2013.01); *G02B 27/48* (2013.01); *G03B 21/2033* (2013.01); *H04N 9/3111* (2013.01); *H04N 9/3161* (2013.01); *G02B 5/045* (2013.01)

(58) Field of Classification Search
CPC ..... G03B 27/0933; G03B 27/48; G02B 27/48; G02B 5/0236; H04N 9/3161
See application file for complete search history.

(56) References Cited

U.S. PATENT DOCUMENTS

| | | | | |
|---|---|---|---|---|
| 5,313,479 | A * | 5/1994 | Florence | 372/26 |
| 2003/0039036 | A1* | 2/2003 | Kruschwitz et al. | 359/707 |
| 2008/0165401 | A1* | 7/2008 | Kasazumi | 359/196 |
| 2009/0040474 | A1* | 2/2009 | Kamijima | 353/85 |
| 2010/0118535 | A1* | 5/2010 | Kusukame et al. | 362/259 |
| 2012/0092972 | A1* | 4/2012 | Taratorin et al. | 369/13.29 |

FOREIGN PATENT DOCUMENTS

| | | |
|---|---|---|
| JP | 55-065940 | 5/1980 |
| JP | 06-208089 | 7/1994 |

* cited by examiner

*Primary Examiner* — Sultan Chowdhury
*Assistant Examiner* — Danell L Owens
(74) *Attorney, Agent, or Firm* — Sony Corporation

(57) ABSTRACT

An illumination device includes a light source section including a laser light source, and intermittently emitting, at a predetermined frequency, laser light emitted from the laser light source, an optical element passing the laser light emitted intermittently from the light source section, and a drive section vibrating the optical element at a predetermined vibration frequency. An expression 1 or 2 below is satisfied, where f1 [Hz] denotes the frequency, f2 [Hz] denotes a variable frequency of luminance in illumination light emitted from the optical element as a result of vibration of the optical element, n1 denotes an arbitrary integer of 0 or larger and 10 or smaller, and n2 denotes a predetermined integer of 1 or larger.

$$|n1 \times f1 - f2| \geq 20 \qquad 1$$

$$|b2 \times f1 - f2| \leq 3 \qquad 2$$

18 Claims, 11 Drawing Sheets

ILLUMINATION DEVICE AND DISPLAY UNIT FOR SUPPRESSING LUMINANCE UNEVENNESS AND INTERFERENCE PATTERN

CROSS REFERENCES TO RELATED APPLICATIONS

The present application claims priority to Japanese Priority Patent Application JP 2011-082888 filed in the Japan Patent Office on Apr. 4, 2011, and Japanese Priority Patent Application JP 2011-154593 filed in the Japan Patent Office on Jul. 13, 2011, the entire contents of which are hereby incorporated by reference.

BACKGROUND

The present disclosure relates to an illumination device emitting light including laser light, and a display device performing video display using such an illumination device.

An optical module being one main component in a projector, i.e., projection display device, is generally configured by an illumination optical system, i.e., illumination device including a light source, and a projection optical system including a light modulation element. In the field of such a projector, a small-sized (palm-sized) light-weight portable projector called micro-projector is recently becoming popular. In this micro-projector, the light source of an illumination device has been mainly an LED (Light Emitting Diode).

Recently, on the other hand, a new light source of an illumination device receiving attention is a laser. As a projector using laser light of three primary colors of red (R), green (G), and blue (B), a projector using a gas laser has been known, for example. The projector in which the light source is a laser is described in Japanese Unexamined Patent Application Publications Nos. 55-65940 and 6-208089, for example. With the light source being a laser, the resulting projector has a wide range of color reproduction and the power consumption is decreased.

SUMMARY

When coherent light such as laser light is directed to the diffusing surface, a pattern of flecks appears unlike with any ordinary light. Such a pattern is called a speckle pattern. This speckle pattern is produced by the interference of light scattered at points on the diffusing surface in a random phase relationship in accordance with the microscopic asperity on the surface.

With the projector using the laser described above as a light source, the speckle pattern (interference pattern) is superimposed on a display image on a screen. As a result, human eyes perceive the phenomenon as a strong random noise, thereby resulting in degradation of display quality.

With this being the case, for suppressing occurrence of such a speckle pattern (speckle noise) in the projector using a laser as the light source, proposed is to micro-vibrate a predetermined optical element or others where laser light passes through in the projector. The human eyes and brains are generally not able to perceive image flicker within about 20 to 50 ms. This means image in the time range is integrated and then averaged in the human eyes. As such, in the time range, a large number of independent speckle patterns are superimposed on the screen with the aim of averaging the speckle noise to a degree not to be an annoyance in the human eyes. The approach as such possibly prevents the production of any interference pattern resulted from the laser light.

When the optical element is micro-vibrated as such, the interference pattern is indeed suppressed, but in some cases, the luminance unevenness is more conspicuous in the illumination light. This thus causes the degradation of display quality.

It is desirable to provide an illumination device and a display unit capable of suppressing luminance unevenness, and at the same time, suppressing an interference pattern.

An illumination device according to an embodiment of the present disclosure includes a light source section including a laser light source, and intermittently emitting, at a predetermined frequency, laser light emitted from the laser light source, an optical element passing the laser light emitted intermittently from the light source section, and a drive section vibrating the optical element at a predetermined vibration frequency. An expression 1 or 2 below is satisfied, where f1 [Hz] denotes the frequency, f2 [Hz] denotes a variable frequency of luminance in illumination light emitted from the optical element as a result of vibration of the optical element, n1 denotes an arbitrary integer of 0 or larger and 10 or smaller, and n2 denotes a predetermined integer of 1 or larger.

$$|n1 \times f1 - f2| \geq 20 \qquad 1$$

$$|n2 \times f1 - f2| \leq 3 \qquad 2$$

The optical element is typically driven by a sine wave (see FIG. 10B that will be described later, for example). In this case, the "variable frequency (f2) of luminance" above is the frequency of the sine wave. However, the driving waveform of the optical element is not necessarily restricted to that of the sine wave. In such a case, the "variable frequency (f2) of luminance" described above may be the main frequency with the maximum amplitude component. Moreover, the laser light source performs light emission intermittently typically using a rectangular pulse (see FIG. 10A that will be described later, for example). This rectangular pulse generally includes harmonic components of the fundamental frequency, but the "frequency (f1)" described above means the fundamental frequency itself of the drive pulse, for example, a rectangular pulse.

A display unit according to an embodiment of the present disclosure includes an illumination device emitting illumination light, and a light modulation element modulating the illumination light based on a video signal. The illumination device includes a light source section including a laser light source, and intermittently emitting, at a predetermined frequency, laser light emitted from the laser light source, an optical element passing the laser light emitted intermittently from the light source section, and a drive section vibrating the optical element at a predetermined vibration frequency. An expression 1 or 2 below is satisfied, where f1 [Hz] denotes the frequency, f2 [Hz] denotes a variable frequency of luminance in illumination light emitted from the optical element as a result of vibration of the optical element, n1 denotes an arbitrary integer of 0 or larger and 10 or smaller, and n2 denotes a predetermined integer of 1 or larger.

$$|n1 \times f1 - f2| \geq 20 \qquad 1$$

$$|n2 \times f1 - f2| \leq 3 \qquad 2$$

With the illumination device and the display device according to the embodiments of the present disclosure, by vibration of the optical element where the laser light from the laser light source passes, occurrence of an interference pattern resulted from the laser light is suppressed. Moreover, satisfying the expression 1 or 2 described above makes difficult to perceive a beat phenomenon resulted from the relationship in the illumination light, between the variable frequency (vibration frequency) of luminance as a result of the vibration of the optical element, and the frequency described above.

According to the illumination device and the display device according to the embodiments of the present disclosure, by vibrating the optical element where the laser light from the laser light source passes, and by satisfying the expression 1 or 2 described above, the occurrence of an interference pattern resulted from the laser light is suppressed, and a beat phenomenon becomes difficult to be perceived, is the beat phenomenon being resulted from the relationship, in the illumination light, between the variable frequency (vibration frequency) of luminance, and the frequency described above. Accordingly, the luminance unevenness is suppressed while the occurrence of the interference pattern is suppressed (the display quality is improved).

It is to be understood that both the foregoing general description and the following detailed description are exemplary, and are intended to provide further explanation of the disclosure as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

An embodiment of the present disclosure is described in detail with referring to the accompanying drawings. Herein, a description is given in the following order.

1. Embodiment (example of using a prism array as an optical element)
2. Modifications
Modification 1 (example considering the relationship between a vibration frequency and a variable frequency of luminance in illumination light)
Modification 2 (example of dynamically controlling an emission frequency and a vibration frequency by a control section)
Modification 3 (example of using a diffraction element as an optical element)
Other Modifications

Embodiment

[Entire Configuration of Display Device 3]

Figure 1:
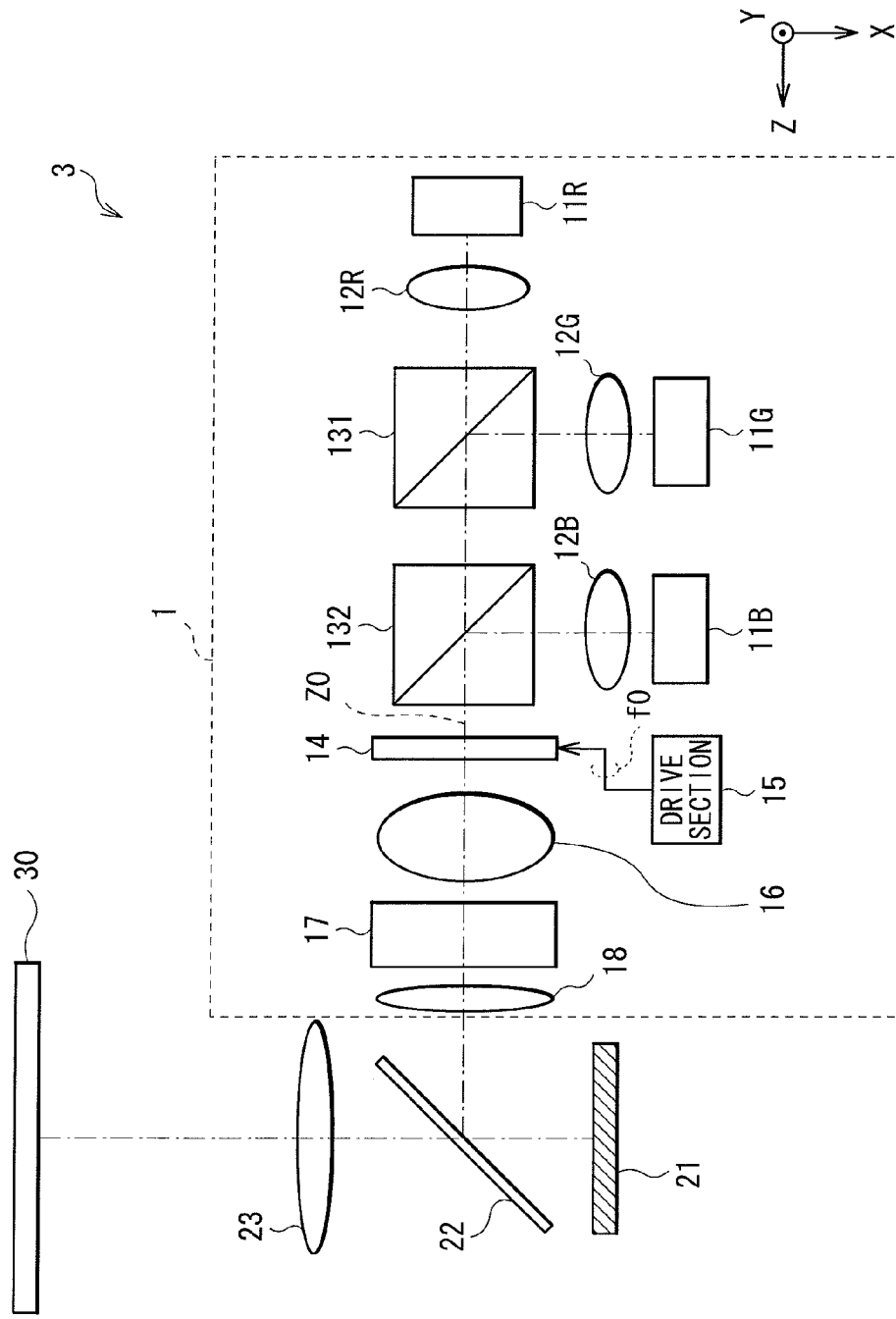
FIG. 1 is a diagram showing the entire configuration of a display device according to an embodiment of the present disclosure.

FIG. 1 is a diagram showing the entire configuration of a display device (display device 3) according to an embodiment of the present disclosure. This display device 3 is a projection display device that performs video (video light) projection onto a screen 30 (projection surface). The display device 3 is configured to include an illumination device 1, and an optical system (display optical system) that performs video display using illumination light coming from the illumination device 1.

[Illumination Device 1]

The illumination device 1 is provided with a red laser 11R, a green laser 11G, a blue laser 11B, lenses 12R, 12G, and 12B, dichroic prisms 131 and 132, an optical element (prism array) 14, a drive section 15, a collimator lens 16, a fly-eye lens 17, and a condenser lens 18. In the drawing, a reference numeral Z0 denotes an optical axis.

The red, green, and blue lasers 11R, 11G, and 11B are three types of light sources emitting laser light of red, green, and blue, respectively. These laser light sources configure a light source section, and in this example, these three types of light sources are each a laser light source. The red, green, and blue lasers 11R, 11G, and 11B are each a semiconductor laser, a solid-state laser, or others, for example. Assuming that these laser light sources are each a semiconductor laser, the red laser light has the wavelength of about $\lambda r$=600 to 700 nm, the green laser light has the wavelength of about $\lambda g$=500 to 600 nm, and the blue laser light has the wavelength of about $\lambda d$=400 to 500 nm, for example.

Figure 2:
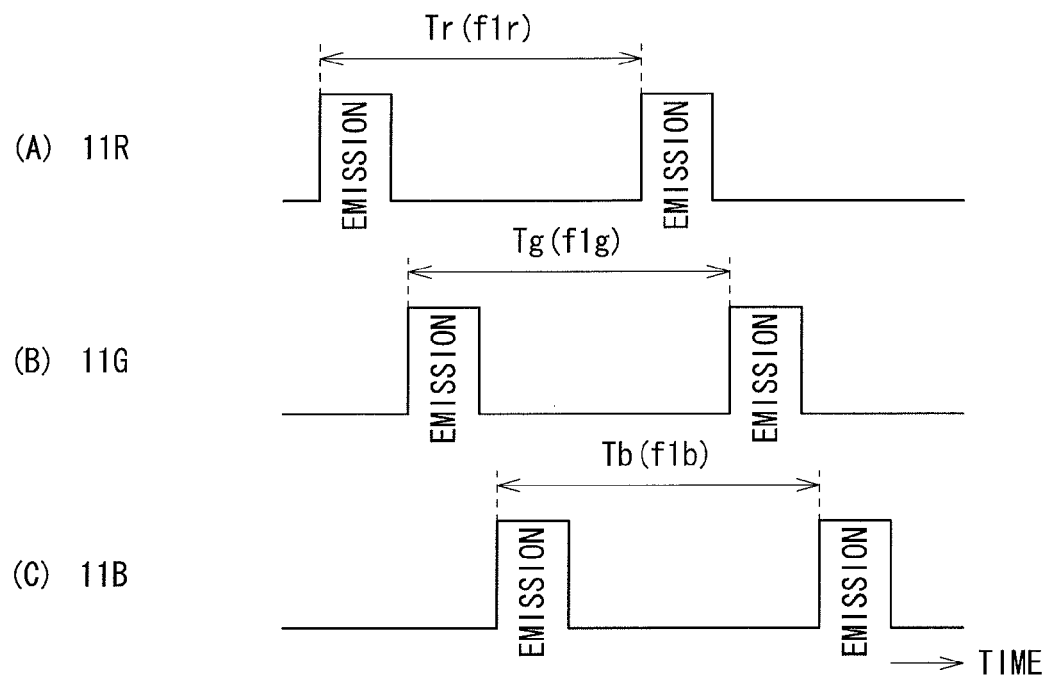
FIG. 2 is a timing chart of an exemplary operation of pulse emission in each laser light source of FIG. 1.

In this example, the red, green, and blue lasers 11R, 11G, and 11B are to perform pulse emission as exemplarily shown in (A) to (C) of FIG. 2, respectively. In other words, the red laser 11R emits the red laser light intermittently (sporadically) at a predetermined emission frequency f1$r$ [Hz] (emission cycle Tr=1/f1$r$). The green laser 11G emits the green laser light intermittently at a predetermined emission frequency f1$g$ [Hz] (emission cycle Tg=1/f1$g$). The blue laser 11B emits the blue laser light intermittently at a predetermined emission frequency f1$b$ [Hz] (emission cycle Tb=1/f1$b$). In this example, as shown in FIG. 2, the light emission is performed in a time-divisional manner sequentially in order of the red laser light, the green laser light, and the blue laser light. Herein, the emission frequencies f1$r$, f1$g$, and f1$b$ mean their fundamental frequencies. In this example, the emission frequencies f1$r$, f1$g$, and f1$b$ are assumed as being equal to one another (hereinafter, this is indicated as f1$r$=f1$g$=f1$b$=f1 as appropriate). The emission frequency f1 at this time is typically about f1=60 to 120 [Hz], but this is surely not restrictive, and the emission frequency f1 may be determined in accordance with the display quality or others in the projector (the display device 1).

The lenses 12R and 12G are lenses (coupling lenses) for collimating the red and green laser light coming from the red laser 11R and the green laser 11G, respectively, to couple the resulting parallelized light to the dichroic prism 131. Similarly, the lens 12B is a lens (coupling lens) for collimating the laser light coming from the blue laser 11B to couple the resulting parallelized light to the dichroic prism 132. In this example, these lenses 12R, 12G, and 12B are operated to collimate their corresponding incoming laser light, i.e., to have the parallelized light, but this is surely not restrictive, and the laser light is not necessarily collimated by the lenses 12R, 12G, and 12B (the parallelized light is not necessarily expected). However, collimating the laser light as above is more desirable because the resulting device configuration is allowed to be reduced in size.

The dichroic prism 131 selectively passes therethrough the red laser light coming via the lens 12R, and selectively reflects the green laser light coming via the lens 12G. The dichroic prism 132 selectively passes therethrough the red and green laser light coming from the dichroic prism 131, and selectively reflects the blue laser light coming via the lens 12B. Thus, this leads to color synthesis (optical-path synthesis) with respect to the red, green, and blue laser light.

The optical element (prism array) 14 is provided on the optical path between the light source and the fly-eye lens 17, and to be specific, on the optical path between the dichroic prism 132 and the collimator lens 16. The optical element (prism array) 14 corresponds to a specific example of the "optical element" of the present disclosure. The prism array 14 is an optical element for reducing a speckle noise (interference pattern) that will be described later, and this prism array 14 is so configured as to pass therethrough the laser light proceeding on the optical axis Z0 shown in the drawing. In other words, this prism array 14 passes therethrough the laser light (the red, green, and blue laser light) coming from the light source section (the red, green, and blue lasers 11R, 11G, and 11B) intermittently at the emission frequency f1 (=f1$r$, f1$g$, and f1$b$).

Figure 3:
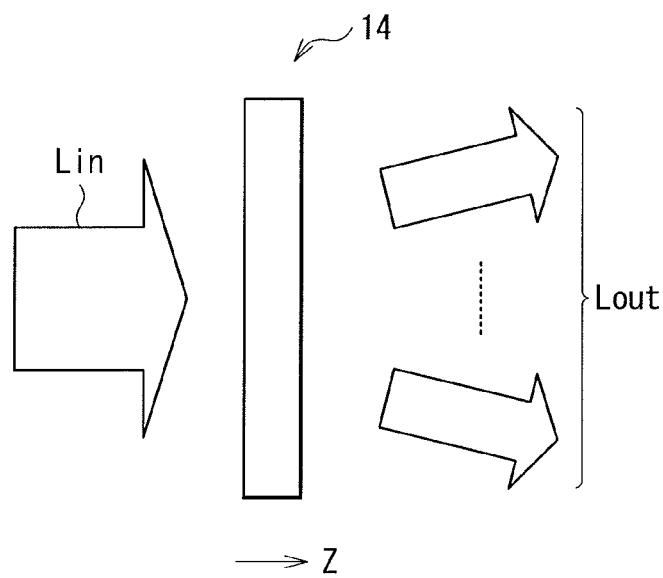
FIG. 3 is a schematic diagram for illustrating the function of an optical element of FIG. 1.

With the "optical element" in the embodiment of the present disclosure exemplified by such a prism array 14, as exemplarily shown in FIG. 3, an incoming luminous flux (incoming light Lin) is split into two or more directions, i.e., two or more directions different from each other, and is emitted as outgoing light Lout. In other words, instead of emitting the incoming light Lin only in one direction by changing the optical path thereof, the incoming light Lin is provided with a phase difference so that the outgoing light Lout is emitted in two or more directions, i.e., various different directions.

Figure 4:
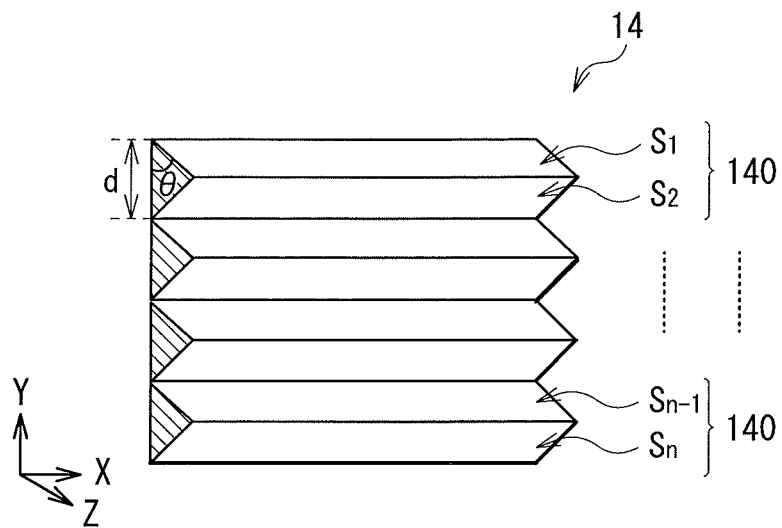
FIG. 4 is a perspective view of a prism array being an example of the optical element of FIG. 1, showing an exemplary detailed configuration thereof.
Figure 6:
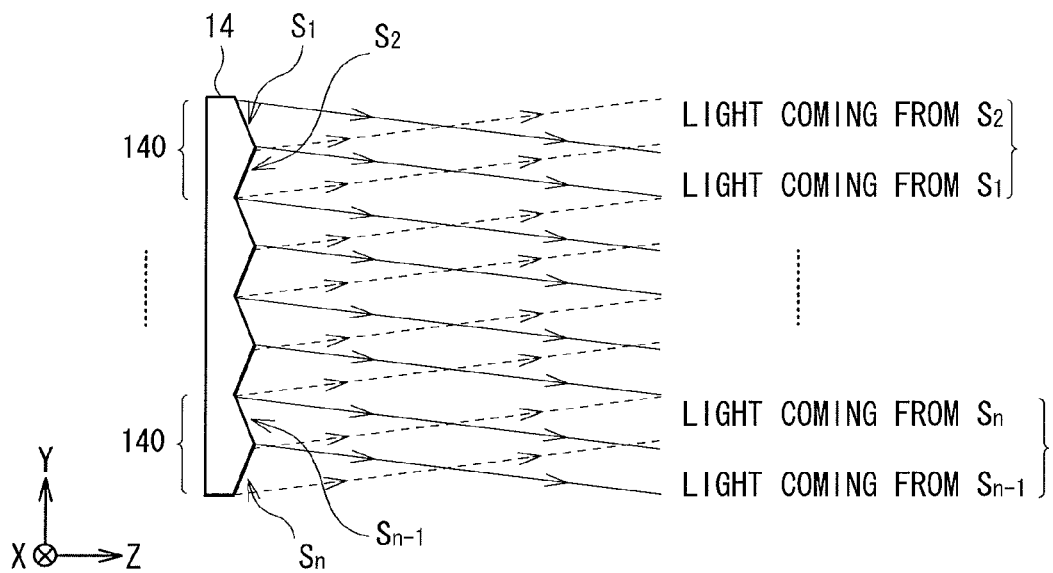
FIG. 6 is a schematic diagram for illustrating the function of the prism array of FIG. 4.
Figure 7:
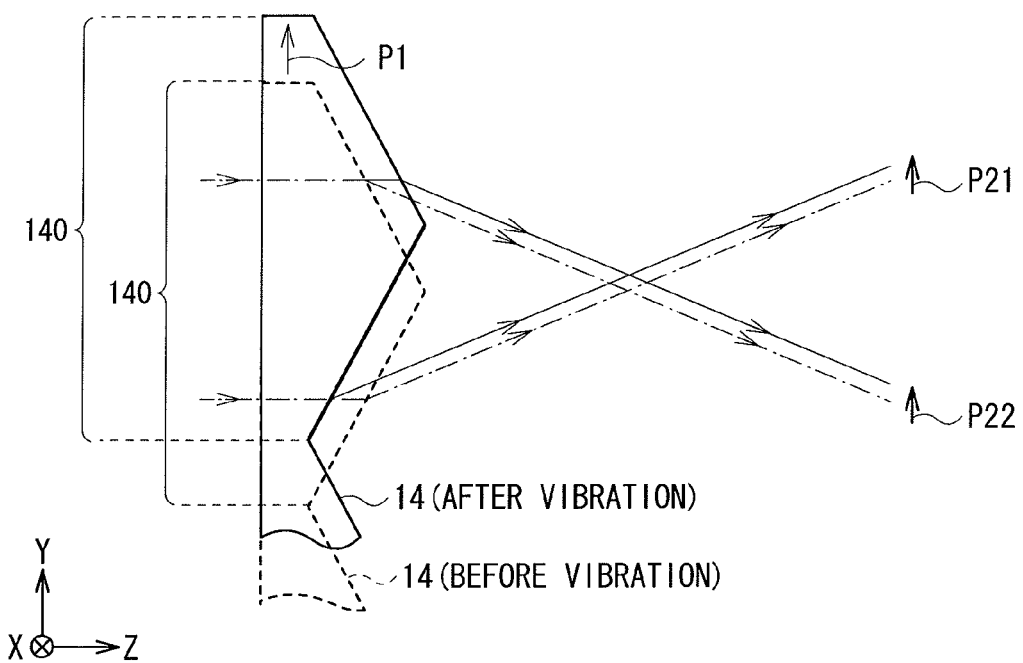
FIG. 7 is a schematic diagram for illustrating a beam scanning operation by vibration of the prism array.

FIG. 4 is a perspective view of the prism array 14, schematically showing an exemplary detailed configuration thereof. In this prism array 14, a plurality of (in this example, n/2 (where n is an integer of 2 or larger) pieces of) prisms 140 (unit structures) are arranged in line along the Y-axis direction (the vibration direction for the prism array 140 itself that will be described later). The prisms 140 are each provided, on the laser-light emission side thereof (+Z-axis direction), with a pair of inclined surfaces each extending in the X-axis direction. This means that these prisms 140 are arranged in line along the direction (Y-axis direction) orthogonal to the direction (X-axis direction) along which the pair of inclined surfaces are extended in the emission surface (X-Y plane). To be specific, in order toward the negative direction of the Y-axis in the drawing, the first prism 140 has a pair of inclined surfaces (the first and second surfaces) $S_1$ and $S_2$, the second prism 140 has a pair of inclined surfaces (the third and fourth surfaces) $S_3$ and $S_4$, and the (n/2)th prism 140 has a pair of inclined surfaces (the (n−1)th and nth surfaces) $S_{n-1}$ and $S_n$. Thus, the prisms 140 are each shaped like a triangular prism extending along the X-axis direction (the pitch in the Y-axis direction (prism pitch): d, and the tilt angle of each inclined surface: A), and, in the entire emission surface of the prism array 14, ridge portions (convex portions) and groove portions (concave portions) are alternately formed. Note that, in this example, although the convex portion (inclined surface) is located on the emission surface side of each prism 140, this is surely not restrictive, and the convex portion may be located on one or both of the incident and emission surface side thereof. The detailed function of the prism array 14 will be described later (FIGS. 6 and 7).

The drive section 15 is for changing one or both of the incident position or angle (the incident position, the incident angle, or both the incident position and angle) of laser light in the incident surface of the fly-eye lens 17. Such a change is made by changing the relative position between the prism array 14 and the fly-eye lens 17. Especially in the embodiment, the drive section 15 is so configured as to change the relative position as described above by vibrating (micro-vibrating) the prism array 14. To be specific, the drive section 15 in this example vibrates the prism array 14 along the Y-axis direction, along which the prisms 140 of FIG. 4 are arranged. The approach of how to define (determine) the vibration frequency f0 at the time of vibrating the prism array 14 as such, (one characteristic feature of the embodiment) will be described in detail later. Herein, the vibration frequency f0 indicates the main frequency with the maximum amplitude. Such a drive section 15 is configured by including a coil and a permanent magnet, for example. The permanent magnet is exemplified by the one made of neodymium (Nd), iron (Fe), boron (B), or others.

The collimator lens 16 is provided on the optical path between the prism array 14 and the fly-eye lens 17 to have parallelized light by collimating light coming from the prism array 14.

The fly-eye lens 17 is an optical member (integrator) configured by a plurality of lenses two-dimensionally arranged on the substrate. The fly-eye lens 17 is for spatially splitting, before emission, incoming luminous flux in accordance with how these lenses are arranged. With the fly-eye lens 17, the light coming therefrom is made uniform (the intensity distribution in the plane is made uniform), and the resulting light is emitted as illumination light. Note that this fly-eye lens 17 corresponds to a specific example of the "optical member" of the present disclosure.

The condenser lens 18 is for gathering the light provided after being made uniform by the fly-eye lens 17 (illumination light).

[Display Optical System]

The display optical system described above is configured to include a polarization beam splitter (PBS) 22, a reflective liquid crystal element 21, and a projection lens 23 (projection optical system).

The polarization beam splitter 22 is an optical member that selectively passes therethrough specific polarized light (for example, s-polarized light), and selectively reflects the other polarized light (for example, p-polarized light). Thus, the illumination light (for example, s-polarized light) coming from the illumination device 1 is selectively reflected, and then is directed into the reflective liquid crystal element 21. At the same time, the video light (for example, p-polarized light) coming from this reflective liquid crystal element 21 is selectively passed through, and then is directed into the projection lens 23.

The reflective liquid crystal element 21 is a light modulation element that emits the video light by modulating and reflecting at the same time the illumination light from the illumination device 1, based on a video signal coming from a display control section that is not shown. At this time, the reflective liquid crystal element 21 reflects the illumination light so as to have the different polarized lights (for example, s- and ppolarized light) between at the time of light incidence and emission. Such a reflective liquid crystal element 21 is exemplified by a liquid crystal element including LCOS (Liquid Crystal On Silicon), or others.

The projection lens 23 is for projecting (enlarging and projecting), onto the screen 30, the illumination light (video light) after being modulated by the reflective liquid crystal element 21.

[Function and Effect of Display Device 3]

1. Display Operation

In this display device 3, as shown in FIG. 1, first, in the illumination device 1, the light (laser light) coming from the red, green, and blue lasers 11R, 11G, and 11B is collimated respectively by the lens 12R, 12G, and 12B, and becomes parallelized light. Next, the laser light being the parallelized light in such a manner (the red, green, and blue laser light) is subjected to color synthesis (optical-path synthesis) by the dichroic prisms 131 and 132. The resulting laser light subjected to the optical-path synthesis passes through the prism array 14, and then is collimated by the collimator lens 16. The resulting parallelized light then enters the fly-eye lens 17. This parallelized light is made uniform by the fly-eye lens 17 (the intensity distribution in the plane is made uniform), and then is emitted and gathered by the condenser lens 18. In this manner, the illumination light is emitted from the illumination device 1.

Thereafter, this illumination light is selectively reflected by the polarization beam splitter 22, and then is directed into the reflective liquid crystal element 21. From the reflective liquid crystal element 21, this incident light is emitted as video light by being modulated and reflected at the same time based on a video signal. In the reflective liquid crystal element 21, because the polarized light at the time of light incidence and emission are different from each other, the video light coming from the reflective liquid crystal element 21 selectively passes through the polarization beam splitter 22, and then is directed into the projection lens 23. The light (video light) entered the projection lens 23 is then projected (enlarged and projected) by the projection lens 23 onto the screen 30.

At this time, as exemplarily shown in FIG. 2, the red, green, and blue lasers 11R, 11G, and 11B respectively perform intermittently the emission operation at the predetermined emission frequency f1 (=f1$r$, f1$g$, and f1$b$). Thus, the laser light (the red, green, and blue laser light) is sequentially emitted in a time-divisional manner. In the reflective liquid crystal element 21, based on a video signal of each color component (red, green, or blue component), the laser light of the corresponding color is sequentially modulated in a time-divisional manner. Thus, the color video display is performed on the display device 3 based on the video signals.

2. Function of Characteristic Feature Section

Described next in detail is the function of the characteristic feature of the embodiment of the present disclosure (the effect of the illumination device 1) in comparison with a comparative example.

2-1. Comparative Example

Figure 5:
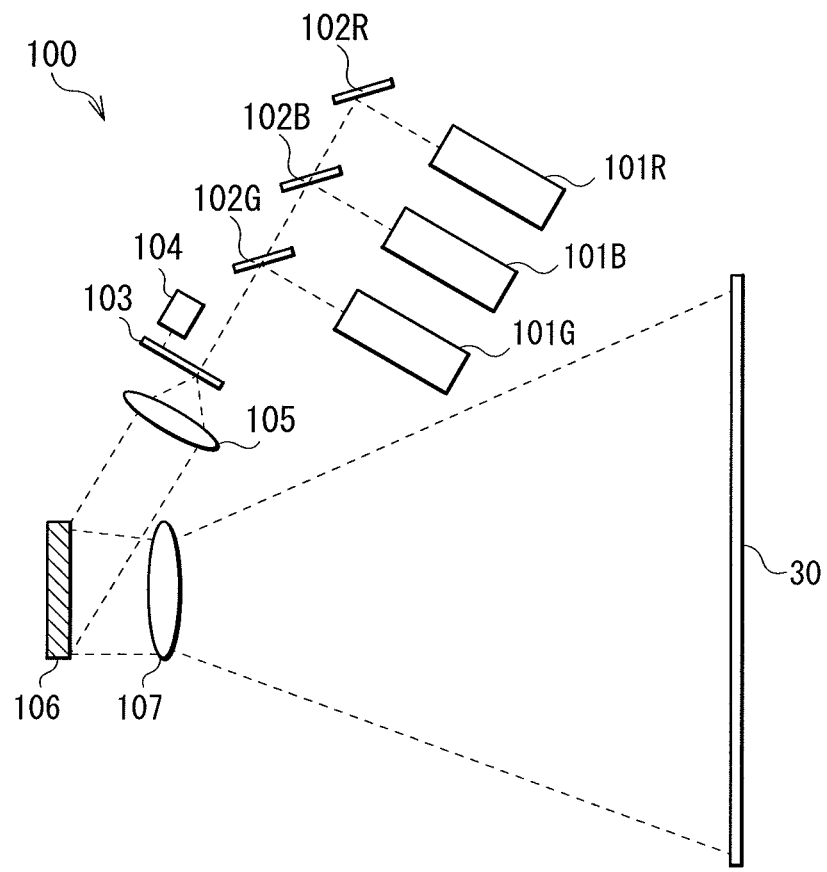
FIG. 5 is a diagram showing the entire configuration of a display device according to a comparative example.

FIG. 5 is a diagram showing the entire configuration of a display device according to a comparative example (display device 100). Similarly to the display device 3 in the embodiment, the display device 100 in this comparative example is a projection display device that projects video light with respect to the screen 30. The display device 100 is configured to include a red laser 101R, a green laser 101G, a blue laser 101B, dichroic mirrors 102R, 102G, and 102B, a diffusion element 103, a motor (drive section) 104, a lens 105, a light modulation element 106, and a projection lens 107.

In this display device 100, the laser light of colors coming from the red, green, and blue lasers 101R, 101G, and 101B is subjected to color synthesis (optical-path synthesis) in the dichroic mirrors 102R, 102G, and 102B, respectively, and is then directed into the diffusion element 103. This incident light is diffused by the diffusion element 103, and then is directed to the lens 105 to be irradiated to the light modulation element 106 as illumination light. From this light modulation element 106, this illumination light is emitted as video light by being modulated and reflected at the same time based on a video signal. The resulting video light is projected (enlarged and projected) onto the screen 30 by the projection lens 107 so that the color video display is performed on the display device 100 based on the video signal.

When coherent light such as laser light is directed to the diffusing surface, a pattern of flecks appears unlike with any ordinary light. Such a pattern is called a speckle pattern. This speckle pattern is produced by the interference of light scattered at points on the diffusing surface with a random phase relationship in accordance with the microscopic asperity on the surface.

With the projector using the laser light source as the display device 100 in the comparative example as described above, the speckle pattern (interference pattern) is superimposed on a display image on the screen. As a result, human eyes perceive the phenomenon as a strong random noise as it is, thereby resulting in degradation in display quality.

With this being the case, for suppressing such occurrence of a speckle pattern (speckle noise) in the projector using a laser light source, proposed is to micro-vibrate a predetermined optical element or screen where laser light passes through in the projector. The human eyes and brains are generally not able to perceive image flicker within about 20 to 50 ms. This means an image in the time range is integrated and averaged in the human eyes. THus, in the time range, a large number of independent speckle patterns are superimposed on the screen with the aim of averaging the speckle noise to a degree not to be an annoyance in the human eyes.

Therefore, in the display device 100 of the comparative example as described above, to suppress the occurrence of speckle noise, the diffusion element 103 is mechanically rotated by the motor 104 to change (to micro-vibrate), at a high speed, the position of the speckle pattern on the screen 30.

2-2. Embodiment

On the other hand, also in the illumination device 1 of the embodiment, the drive section 15 drives the optical element 14 so as to vibrate (micro-vibrate) the optical element (prism array) 14 where laser light passes. This accordingly suppresses the occurrence of a speckle noise (interference pattern) resulted from the laser light as will be described in detail below.

[About Function Suppressing Interference Pattern]

First, in the prism array 14, the light entered each of the prisms 140 is emitted as below from the pair of inclined surfaces thereof. Specifically, as shown in FIG. 6, from the pair of inclined surfaces of each of the prisms 140, the light is emitted so as to make a position change between the incoming light, and the outgoing light on the plane on the incident surface of the fly-eye lens 17 in this example located away from the prism array 14 with a predetermined distance therebetween. To be specific, in the above-described first prism 140 in the prism array 14, between the inclined surfaces $S_1$ and $S_2$, a position change is made between the incoming light and the outgoing light on the incident surface of the fly-eye lens 17. In other words, the light coming from the inclined surface $S_1$ is directed to the position where the light enters the inclined surface $S_2$ (toward the lower portion in the emission surface of the first prism 140). On the other hand, the light coming from the inclined surface $S_2$ is directed to the position where the light enters the inclined surface $S_1$ (toward the upper portion in the emission surface of the first prism 140). Similarly, in the (n−2)th prism 140 described above, between the inclined surfaces and $S_n$, a position change is made between the incoming light and the outgoing light on the incident surface of the fly-eye lens 17. In other words, the light coming from the inclined surface $S_{n-1}$ is directed to the position where the light enters the inclined surface $S_n$ (toward the lower portion in the emission surface of the (n/2)th prism 140). On the other hand, the light coming from the inclined surface $S_n$ is directed to the position where the light enters the inclined surface $S_{n-1}$ (toward the upper portion in the emission surface of the (n/2)th prism 140). Note that such a function of position change between the incoming light and the outgoing light is allowed to be arbitrarily adjusted by the setting of the prism pitch d and the tilt angle θ.

The drive section 15 then changes the relative position between the prism array 14 and the fly-eye lens 17. To be specific, as indicated by an arrow P1 in FIG. 7, for example, the drive section 15 changes the relative position described above by vibrating the prism array 14 along the direction along which the prisms 140 are arranged (in the Y-axis direction), in the plane orthogonal to the optical axis Z0. This means that the light coming from the inclined surface of each of the prisms 140 described above (the light so emitted as to be changed in position between a pair of inclined surfaces) is also changed (shifted) in position along the Y-axis direction as indicated by arrows P21 and P22 in FIG. 7, for example. This accordingly leads to, on the incident surface of the fly-eye lens 17, a beam scanning by the light coming from each of the prisms 140 in the prism array 14. As a result, by the principles described above (multiplexing of speckle patterns (time average)), the occurrence of the speckle noise (interference pattern) resulted from the laser light is suppressed.

Also, in the embodiment, the drive section 15 shifts the relative position between the prism array 14 and the fly-eye lens 17 (vibrates the prism array 14 itself in this example), so as to change one or both of the incident position or angle of the laser light in the incident surface of the fly-eye lens 17. This accordingly reduces or avoids optical loss at the time of light incidence from the prism array 14 to the fly-eye lens 17 even if the relative position is shifted (even if a beam scanning operation is performed) as described above. More in detail, with the approach in the comparative example described above, the light use efficiency is impaired because the diffusion element 103 diffuses the light entering thereinto. On the other hand, in this embodiment, unlike the approach in the comparative example, loss of laser light is reduced to minimum or avoided when the attempt to reduce the speckle noise is made by multiplexing (time average) thereof

[About Function of Reducing Luminance unevenness]

Figure 8:
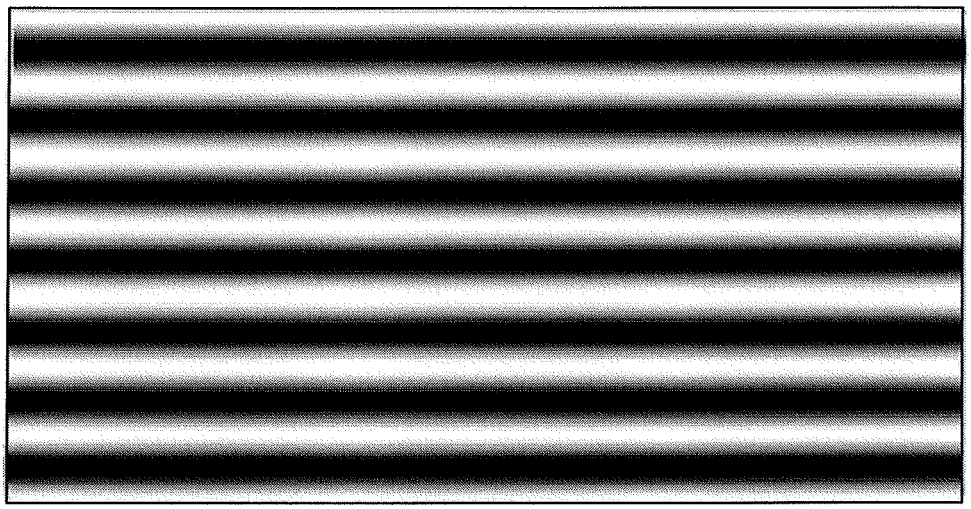
FIG. 8 is a schematic diagram of exemplary luminance unevenness perceived on the screen.

When the optical element (the prism array 14) is micro-vibrated in such a manner, the occurrence of interference pattern is indeed suppressed, but in some cases, such luminance unevenness (illumination unevenness) as exemplarily shown in FIG. 8 are observed in the illumination light. This causes the reduction of display quality. Such luminance unevenness is resulted from the attempt to suppress the occurrence of the interference pattern using the prism array 14 as an alternative to the diffusion element in the comparative example.

In other words, the prism array 14 is so configured as to change (bend) the optical path of the incoming light Lin without lowering the light use efficiency (without light diffusion), unlike the diffusion element. This causes, principally, the luminance unevenness easily in the illumination light (on the screen 30). With the prism array 14, the luminance unevenness easily occurs in the illumination light due to the shadow of the asperity (the inclined surfaces $S_1$ to $S_n$) of each of the prisms 140. On the other hand, if the angle of the asperity (the tilt angle of the inclined surfaces $S_1$ to $S_n$) is reduced to a degree that the luminance unevenness caused thereby becomes unperceivable, the function of reducing the interference pattern is impaired (the degree of reduction is decreased).

Moreover, such luminance unevenness is indeed suppressed to some degree by vibration of the prism array 14, but may be emphasized depending on the relationship between the vibration frequency f0 of the prism array 14 and the emission frequency f1 of the laser light. That is, a beat phenomenon that will be described in detail later occurs depending on the values of the vibration frequency f0 and the emission frequency f1, and thus the luminance unevenness becomes easily perceived. To be specific, when the vibration frequency f0 and the emission frequency f1 take values close to each other, these frequencies generate a beat frequency, and it is easier to perceive the luminance unevenness moving slowly.

Figure 9:
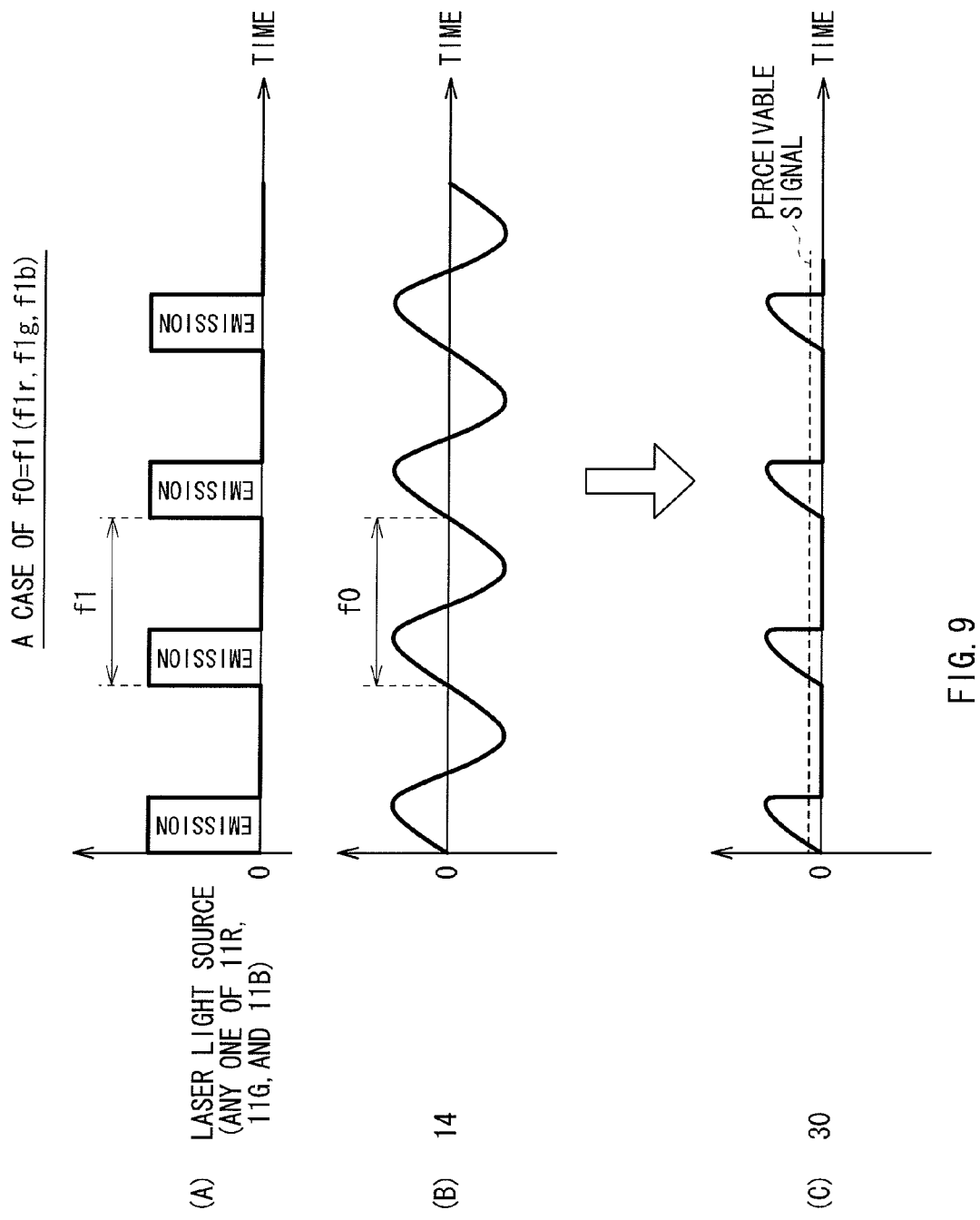
FIG. 9 is a timing chart of exemplary relationship between an emission frequency and a vibration frequency, and the luminance unevenness on the screen.

To be more specific, when the laser light source performs pulse emission, and when the optical element (prism array) 14 is vibrated as shown in (A) and (B) of FIG. 9 (the vibration frequency f0=the emission frequency f1), the illumination light being the result of waveform synthesis (video light on the screen 30) has the luminance as shown in (C) of FIG. 9, for example, i.e., the timing waveform with a fluctuation at a certain cycle. However, any change of luminance in a cycle is averaged (temporally integrated) without being visible (perceived) by human eyes, and looks like a perceivable signal indicated by broken lines in FIG. 9C, i.e., looks like not moving. Therefore, even if the illumination light originally has spatial luminance unevenness, the luminance unevenness looks like not moving and being still.

Figure 10:
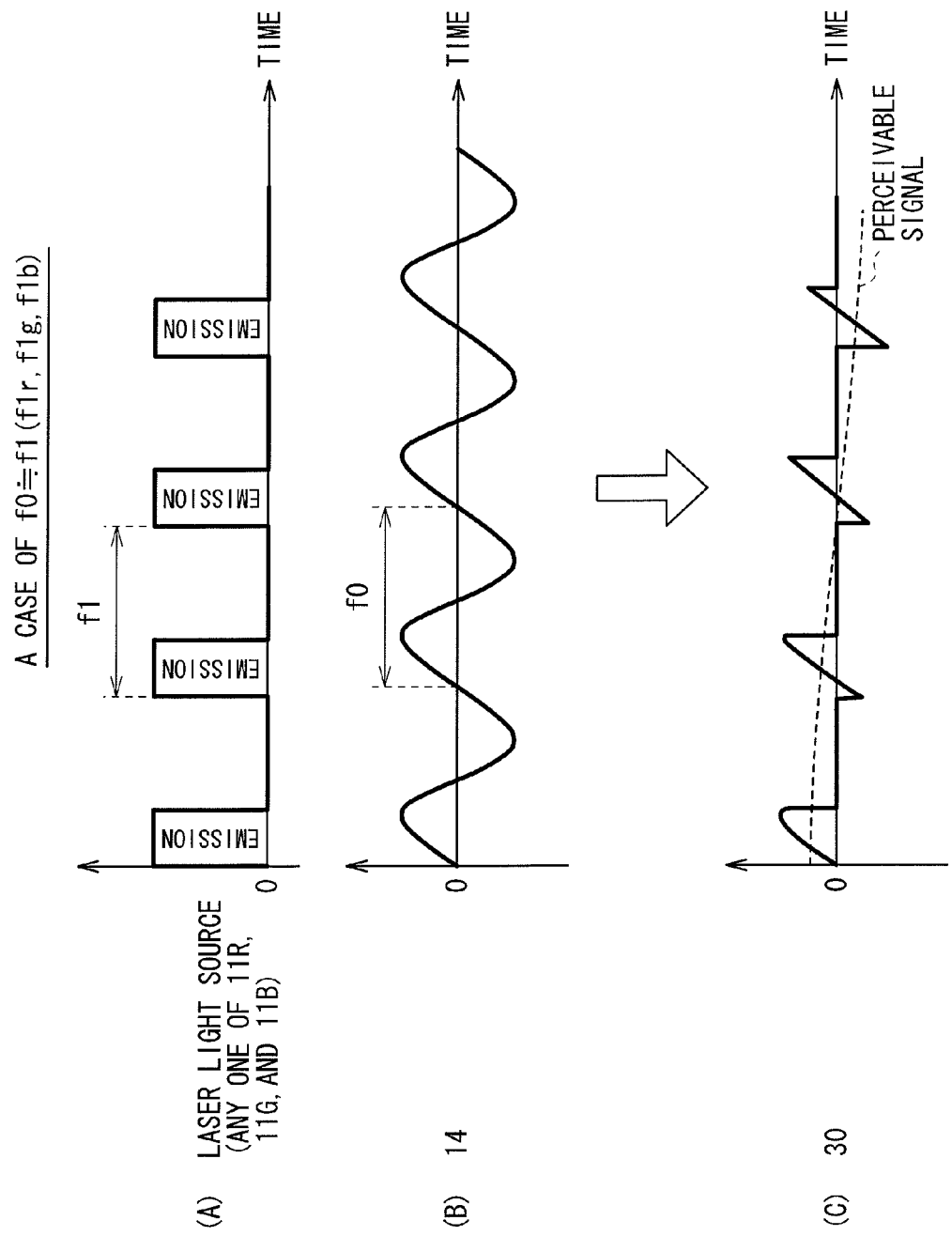
FIG. 10 is a timing chart of another exemplary relationship between the emission frequency and the vibration frequency, and the luminance unevenness on the screen.

On the other hand, as exemplarily shown in (A) and (B) of FIG. 10, when there is a slight difference between the vibration frequency f0 and the emission frequency f1, i.e., when the frequencies are substantially equal to each other (the vibration frequency f0≈the emission frequency f1), the luminance of the illumination light (the video light on the screen 30) is as shown in (C) of FIG. 10, for example. Specifically, a perceivable signal (indicated by broken lines in (C) of FIG. 10) being the result of time average does not remain fixed in value as above but shows a low-frequency sine wave, for example, and the low-frequency movement (occurrence of the beat phenomenon described above) becomes perceivable. Therefore, if the illumination light originally has spatial luminance unevenness, the movement of the luminance unevenness may possibly look like flickering.

Herein, considering that the human eyes have the frequency sensitivity with the upper limit of about 20 Hz under the worst environment, when a beat frequency |f1−f0| generated by the vibration frequency f0 and the emission frequency f1 is lower than 20 Hz (|f1−f0|<20), the human eyes perceive a beat phenomenon (flickering of luminance unevenness). However, considering the harmonic component (harmonic frequency) of the emission frequency f1 (fundamental frequency), a beat phenomenon is perceived when |n×f1−f0|<20 is satisfied, where n (harmonic order) is an integer of 0 or larger. Assuming here that the emission pulses of the laser light are rectangular as shown in FIGS. 2, 9, and 10, for example, the harmonic component has the signal level in proportion to (1/n). This thus tells that, generally, considering the harmonics up to about n≤10 may be enough. When n=0, this corresponds to a case where the laser light is emitted at all times. As such, considering the harmonics of 1≤n≤10 is desirable. Note that, as for the vibration frequency f0, only the main frequency (fundamental frequency) with the maximum amplitude component may need to be considered (the harmonic component may need to be considered).

Herein, the above-described value of "20 Hz" may be defined under the hypothetical condition that, in Temporal Contrast Sensitivity Function (see "The Temporal Responsiveness of Vision" by Hart. Jr W. M, for example), when a picture with the brightness of 50 lumens is projected in a size of 25 inches, the luminance distribution is with the brightness of 1% therein. The condition corresponds to 7 trolands (the pupil diameter φ=3 mm, and with the hypothesis of complete diffusion) and, assuming that the luminance distribution is of about 10% in the X direction of the display screen (50 mm), the condition corresponds to that the frequency of 20 Hz or higher is not perceived by the human eyes. Herein, such a condition is generally often more strict, and if this is the case, the frequency range available for use will be much narrower.

Figure 11:
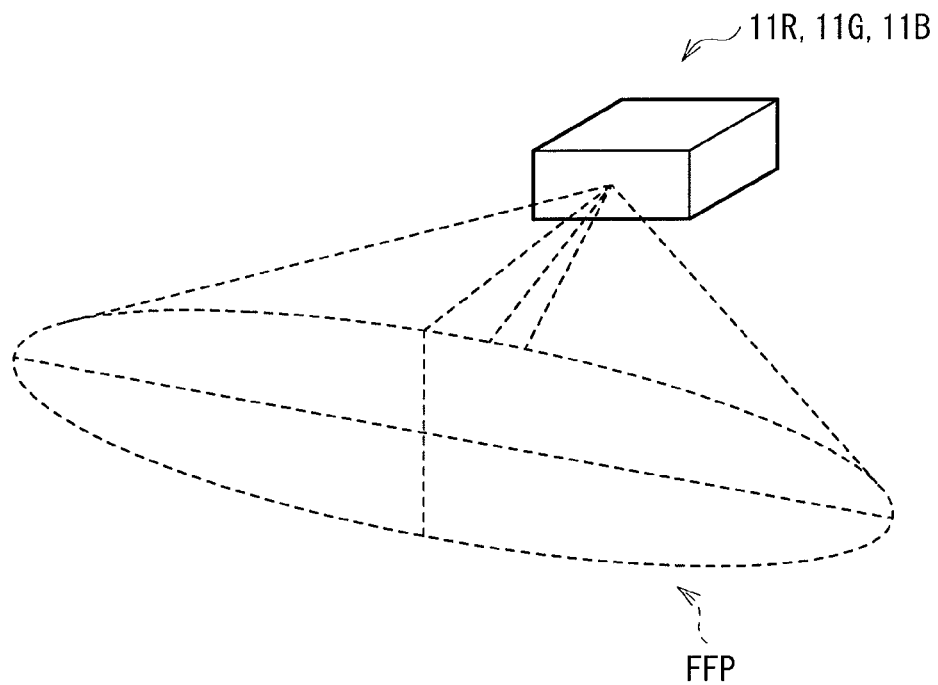
FIG. 11 is a schematic diagram showing an exemplary far field pattern (FFP) of laser light coming from each of the laser light sources of FIG. 1.

Such luminance unevenness is caused not only as described above, i.e., due to the attempt to suppress the occurrence of the interference pattern using the prism array as an alternative to the diffusion element, but also by as the reason below. That is, as exemplarily shown in FIG. 11, when the far field pattern (FFP) of the laser light is not circular (isotropic), for example, is oval in this example, the luminance distribution of the illumination light is observed with spatial unevenness, thereby easily leading to the luminance unevenness. In other words, there may be cases where the luminance unevenness of the illumination light is not suppressed sufficiently (the luminous distribution is not uniform) even by the function of the fly-eye lens 17. As a measure to be taken therefor, a possibility is the approach of providing an anamorphic lens (lens whose curvature is not isotropic), but this approach may increase the component cost.

In the illumination device 1 of this embodiment, the following Expression 1 or 2 is satisfied, where f1 [Hz] denotes the emission frequency, f2 [Hz] denotes the variable frequency of the luminance generated by vibration of the optical element 14 in the illumination light from the optical element 14, n1 denotes an arbitrary integer of 0 or larger and 10 or smaller, and n2 denotes a predetermined integer of 1 or larger. Note that, in the embodiment, the variable frequency f2 described above is assumed as being equal to the vibration frequency f0, and in the following Expressions 1 and 2, the variable frequency f2 is used for expression. Thus, in the embodiment, it is difficult to observe the beat phenomenon resulted from the relation between the variable frequency f2 (vibration frequency f0) of the luminance generated by the vibration of the optical element 14 in the illumination light, and the emission frequency f1 (beat phenomenon caused by the fundamental frequency and the harmonic component) as described above (difficult to be perceived by human eyes). Herein, such Expressions 1 and 2 will be described below in two cases, i.e., a case where the above-described luminance unevenness is originally observed, and a case where the luminance unevenness is not originally observed.

$$|n1 \times f1 - f2| \geq 20 \qquad 1$$

$$|n2 \times f1 - f2| \leq 3 \qquad 2$$

[A. Case Where Luminance Unevenness Is Originally Observed]

In this case, considering that the human eyes have the frequency sensitivity with the upper limit (about 20 Hz) as described above, Expression 1 above is expected to be satisfied to make the beat phenomenon resulted from the relationship between the vibration frequency f0 and the emission frequency f1 be difficult to be perceived (desirably, not to be perceived). Moreover, for the reasons described above, Expression 1 above is desirably satisfied especially in the case of 1≤n1≤10 (when n1 is an arbitrary integer of 1 or larger and is 10 or smaller). Also for the reasons described above, if Expression 1 above is satisfied when n1 is an arbitrary integer of 0 or larger, the beat phenomenon is not perceived.

Figure 12:
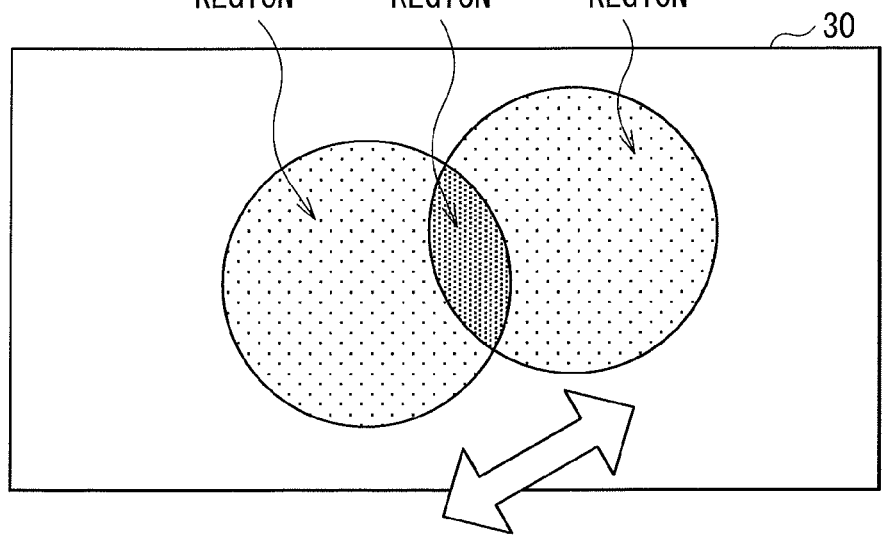
FIG. 12 is a schematic diagram for illustrating the relationship between regions on the screen, i.e., a luminance-unevenness reduced region and a luminance-unevenness unchanged region, and a spatial amplitude in the luminance distribution as a result of the vibration of the optical element.

Also, when Expression 1 is satisfied, the amplitude (vibration width) of the luminance unevenness observed in the illumination light when the prism array 14 is vibrating is desirably larger than the extent (width) of the luminance unevenness observed in the illumination light when the prism array 14 is not vibrating. More specifically, the range of motion of the luminance unevenness observed in the illumination light on the screen 30 when the prism 14 is vibrating is preferably wider than the range of the luminance unevenness of the illumination light. This is because, as exemplarily shown in FIG. 12, a region on the screen 30 where the luminance-unevenness reduced regions are overlapping at all times is a luminance-unevenness unchanged region (region where the luminance unevenness is not reduced). In other words, this means that the variable spatial frequency of the illumination light on the screen 40 at the time of the vibration of the prism array 14 is higher than the spatial frequency of the luminance unevenness. That is, Expression 3 below is preferably also satisfied, where f31, ... f3M (M is an integer of 2 or larger) denote the spatial frequency in the luminance distribution of the illumination light at the time when the prism array 14 is not vibrating in order from the low-frequency side, and A0 denotes the spatial amplitude in the luminance distribution of the illumination light when the prism array 14 is vibrating. Herein, the reason of not including f31 is that the considerably large component size thereof because of the illumination light being brighter at the center portion and therearound and darker in the periphery leads to a difficulty in perceiving by human eyes.

$$(1/f32) \leq A0 \qquad 3$$

(B. Case Where Luminance unevenness Is Not Originally Observed)

On the other hand, when the luminance unevenness is not originally observed, for example, the example in FIG. 9 described above leads to a difficulty in perceiving (preferably no perception of) the beat phenomenon resulted from the relationship between the variable frequency f2 (vibration frequency f0) and the emission frequency f1. In other words, in this case, satisfying Expression 2 instead of Expression 1 is sufficient. In Expression 2, the upper limit (3 Hz) means the beat phenomenon occurring at intervals of about 0.33 seconds. At the occurrence interval as such, the beat phenomenon may not be easily perceived unless the same video display is performed for a long period of time. In this case, however, the beat phenomenon may become easily perceived even with a slight frequency change. Therefore, the vibration frequency f0 and the emission frequency f1 are desirably synchronized with each other with a high precision.

Herein, the upper limit value of "3 Hz" corresponds to the frequency that desensitizes the human eye response in Temporal Contrast Sensitivity Function described above. Moreover, assuming that the upper limit value in Expression 2 is "0.5 Hz", the beat phenomenon occurs at intervals (frequency) of two seconds. Thus, the beat phenomenon is hardly perceived irrespective of the condition, which is confirmed by experiments.

Note that, with the value setting made to satisfy Expression 2, the reduction effect for the interference pattern is to be somewhat impaired. This is because, similarly to the example in FIG. 9, also when the reduction effect for the interference pattern is effective, a region being a light spot at some point in time (in an emission period of laser light) is easily observed as a light spot also in the next emission period. In actuality, however, the occurrence of interference pattern is suppressed due to a slight shift when the prism array 14 is vibrating. The reason is because, in the interference pattern, a difference of brightness is generated as a result of light interference, and thus slight movement exerts a large influence. In consideration thereof, in the embodiment, either Expression 1 described above (with a case of 20 Hz or higher) or Expression 2 described above (with a case of 3 Hz or lower) may be satisfied.

A specific example is as below. That is, first, the red, green, and blue lasers 11R, 11G, and 11B are each set with the above-described emission frequency, i.e., $f1r=f1g=f1b=120$ Hz (=f1). As shown in FIG. 2, laser light of three colors is then emitted sequentially to produce illumination light of white. The delay time for pulse emission at this time of the red, green, and blue laser light is respectively 0 ms, 2.78 ms, and 5.56 ms, for example. At this time, such luminance unevenness (luminous gray stripes) as exemplarily shown in FIG. 8 actually look colored as the gray stripes are at different spacing depending on the wavelength dispersion. With the example of the red laser light, considering that the emission frequency f1r is 120 Hz as described above, the vibration frequency f0 of the prism array 14 is set at 90 Hz not to make a perceivable beat frequency, for example. If this is the case, because Expression 1 above is satisfied with what value n takes (integer of 0 or lager), the beat phenomenon is not perceivable. Also in this case, because the spatial frequency f3 of the luminance distribution of the illumination light is about 5 [1 p/mm] when the prism array 14 is not vibrating, the spatial amplitude A0 of the luminance distribution of the illumination light in Expression 3 above satisfies $A0 \geq (1/f3) = 0.2$ [mm] By vibrating the prism array 14 so as to satisfy such a conditional expression, the resulting luminance unevenness are hardly perceived (become difficult to be perceived). Herein, although exemplified is the red laser light, the same is applicable also to the green and blue laser light.

Moreover, as in the embodiment, when the light source section emits laser light of a plurality of types of wavelengths (laser light of three types of red, green, and blue in this example), Expression 1 or 2 above is preferably satisfied with laser light of the wavelengths as below. To be specific, first, among the plurality of types of wavelengths as such, Expression 1 or 2 described above is desirably satisfied at least with the emission frequency f1 of the laser light with the wavelength corresponding to the color having the highest luminosity factor. Alternatively, among the plurality of types of wavelengths, Expression 1 or 2 described above may be satisfied at least with the emission frequency f1 of the laser light with the wavelengths respectively corresponding to two or more colors having the relatively high luminosity factor. Most desirably, Expression 1 or 2 described above may be satisfied with the emission frequency f1 of the laser light of all of the plurality of types of wavelengths.

To be specific, as in the embodiment, for emission of the laser light of three different wavelengths, i.e., the red laser light (R), the green laser light (G), and the blue laser light (B), first, Expression 1 or 2 described above is desirably satisfied with the emission frequency f1g in the green laser light (G) corresponding to the color having the highest luminosity factor (green). Further, for emission of the laser light of four different wavelengths, i.e., R, G, B, and yellow laser light (Y), or for emission of the laser light of four different wavelengths, i.e., R, G, B, and white laser light (W), for example, Expression 1 or 2 described above is desirably satisfied with the emission frequencies f1g, f1y, and f1w in the laser light of colors of G, Y, and W. Still further, for any type of emission of the laser light, i.e., for emission of the laser light of three different wavelengths, i.e., R, G, and B, for emission of the laser light of four different wavelengths, i.e., R, G, B, and Y, and for emission of the laser light of four different wavelengths, i.e., R, G, B, and W, most desirably, Expression 1 or 2 described above is satisfied with the emission frequency f1 in the laser light of all of the wavelengths (colors). Note that exemplified above is the case where the laser light of various colors has the same emission frequency of f1, but the same is applicable also to the case where the emission frequency is not all the same, for example, the case where the laser light of various colors (R, G, B, and G in this order) is emitted periodically. Moreover, among the laser light of three wavelengths of R, G, and B, when the red laser light (R) and the green laser light (G) partially share the same emission period, for example, the laser light may be individually considered in terms of the emission frequency f1.

As described above, in the embodiment, Expression 1 or 2 described above is satisfied while vibrating the optical element (prism array) 14 where the laser light (the red, green, and blue laser light) from the laser light source (the red, green, and blue lasers 11R, 11G, and 11B). This accordingly suppresses the occurrence of an interference pattern resulted from the laser light, and makes difficult to perceive a beat phenomenon resulted from the relationship between the variable frequency f2 (vibration frequency f0) of luminance in illumination light, and the emission frequency f1. Thus, the luminance unevenness becomes less conspicuous while the occurrence of the interference pattern is suppressed (the display quality is improved).

Further, the occurrence of the interference pattern is suppressed by using the prism array 14 as an alternative to the diffusion element as in the comparative example described above. This accordingly minimizes or avoids the loss of laser light, and thus improves the light use efficiency (reduces the power consumption).

Still further, even when the shape of the FFP of the laser light is not isotropic, vibrating the prism array 14 leads to a difficulty in perceiving the luminance unevenness resulted from such an anisotropic FFP. Therefore, the image quality is improved without providing a member such as anamorphic lens, and the component cost is thus prevented from increasing.

The approach in the embodiment (and those of various modifications below) is applicable to image modulation devices other than an image modulation device scanning laser light (illumination light), i.e., a so-called beam scanning device. This is because, in the beam scanning device, the laser light remains largely spatially coherent, and thus other measure is expected to be taken to suppress the occurrence of the interference pattern. Furthermore, the approach in the embodiment and others not only suppress the occurrence of the interference pattern but also makes less conspicuous the luminance unevenness. This greatly differs from the beam scanning device in terms of frequency characteristics and the resulting effect.

[Modifications]

Described next are modifications (Modifications 1 to 3) of the embodiment described above. In the below, the same component as that in the embodiment is provided with the same reference numeral, and the description thereof is omitted as appropriate.

[Modification 1]

Exemplified above is the case under the hypothetical condition of the vibration frequency f0 of the optical element 14 being equal to the variable frequency f2 of luminance in illumination light (variable frequency of luminance in illumination light due to vibration of the optical element 14). In fact, however, the vibration frequency f0 and the variable frequency f2 are often not equal to each other. As exemplarily shown in FIG. 13, when the optical element 14 is a cylindrical lens array of the one-dimensional array, and when the optical element 14 vibrates with the amplitude twice the cycle thereof, the flickering in the luminance distribution as a result of vibration for one cycle of the optical element 14 (the variable frequency f2) is four times of the vibration frequency f0 (f2=4×f0).

Accordingly, because the vibration frequency f0 originally indicates the flicker frequency in the luminance distribution, if this is the case, the following substitution is expected in the conditional expressions (Expressions 1 and 2) described in the embodiment above. That is, this modification corresponds to an example considering the relationship as above, i.e., the relationship between the vibration frequency f0 and the variable frequency f2 of luminance in illumination light, and Expression 4 below is to be satisfied. In Expression 4, N=(vibration amplitude of optical element 14/unit structure pitch along vibration direction of optical element 14). Assuming that the optical element 14 is the prism array of FIG. 4, the pitch d of the prism 140 is the unit structure pitch.

$$f2=(2 \times N \times f0) \qquad 4$$

To be specific, the conditional expressions (Expressions 1 and 2) in the embodiment above are allowed to be substituted as Expressions 5 and 6 as below, respectively, by using Expression 4. Accordingly, in Modification 1, Expressions 5 and 6 may need to be satisfied.

$$|n1 \times f1 - 2N \times f0| \geq 20 \qquad 5$$

$$|n2 \times f1 - 2N \times f0| \leq 3 \qquad 6$$

Note that there still remains the issue that which frequency component (flicker frequency component) is primary, and even in the case described above, for example, the main component of flicker in the luminance distribution is the quadruple frequency but still includes the single frequency.

Therefore, the most suitable is the product set of the results of calculating the conditional expressions described above for f0 and 4f0.

Figure 13:
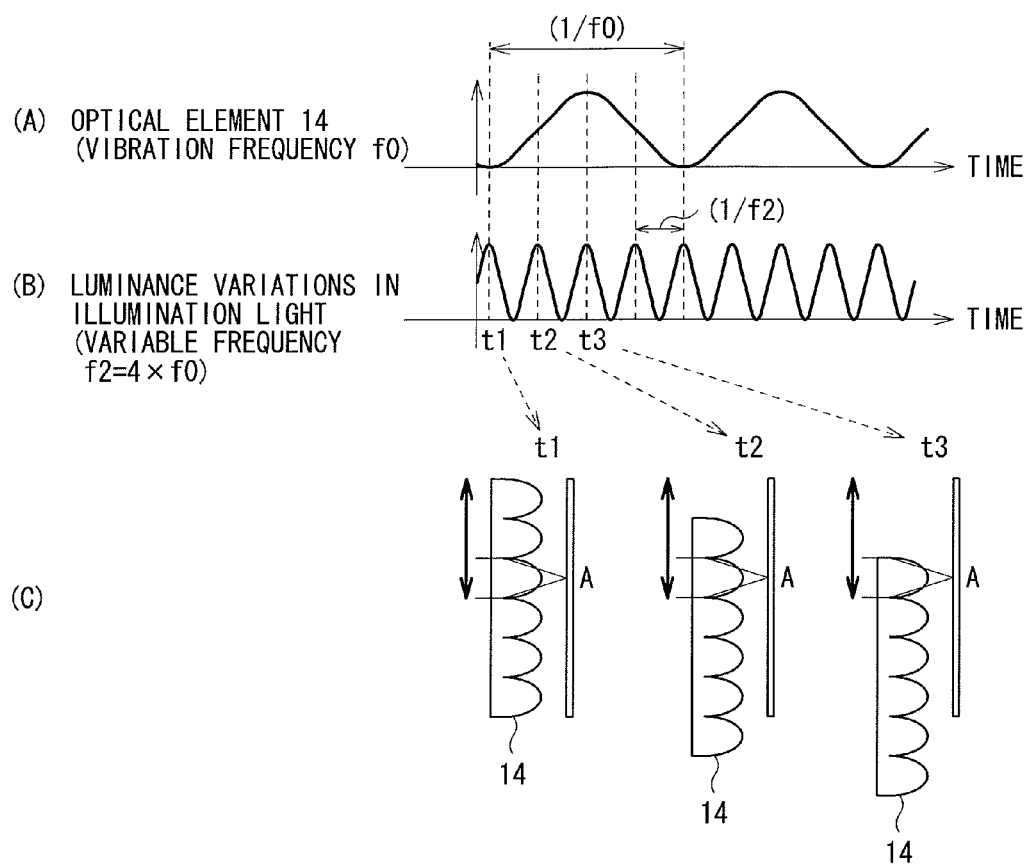
FIG. 13 is a diagram for illustrating an exemplary relationship between a vibration frequency and a variable frequency of luminance in illumination light in Modification 1.

Also by referring to FIG. 13, exemplified is the case where the optical element 14 is a cylindrical lens array with the one-dimensional array. However, the optical element 14 is not restricted to such a configuration as long as a plurality of unit structures are arranged along the vibration direction. In these cases, if any special illumination technique is used, for example, overlaying illumination images using a mirror or others, the equation described above, i.e., N=(vibration amplitude of optical element 14/unit structure pitch along vibration direction of optical element 14), may not be exceptionally established.

[Modification 2]

Figure 14:
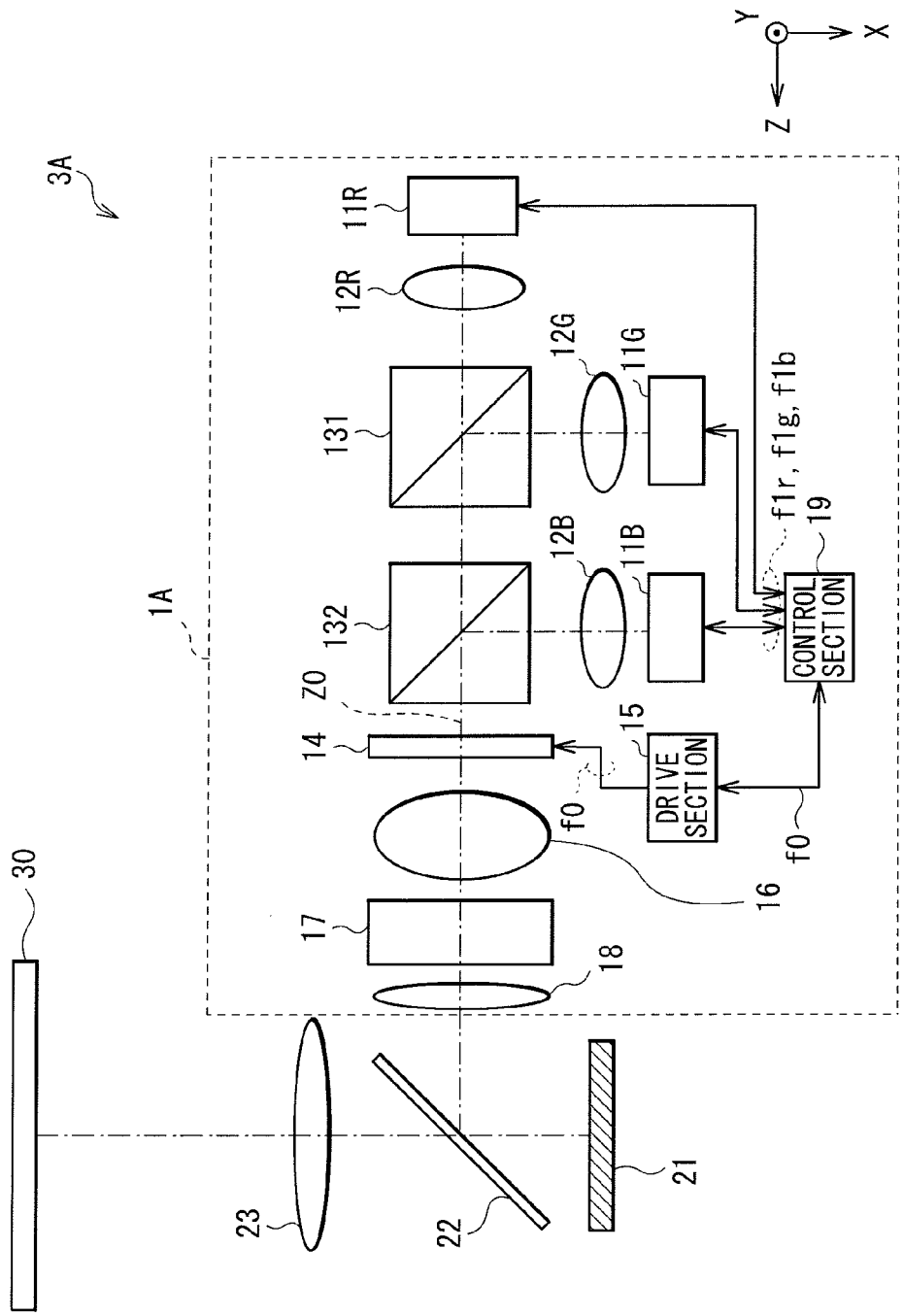
FIG. 14 is a diagram showing the entire configuration of a display device according to Modification 2.

FIG. 14 is a diagram showing the entire configuration of a display device (display device 3A) in Modification 2. Compared with the display device 3 in the embodiment described above, the display device 3A of this modification is configured to include an illumination device 1A that will be described later as an alternative to the illumination device 1, and the remaining configuration is similar to that of the illumination device 1.

The illumination device 1A is configured similarly to the illumination device 1 in the embodiment above except that a control section 19 is additionally provided.

This control section 19 is for dynamically (dynamically whenever necessary) controlling the drive frequency f0 and the emission frequency f1 (f1r, f1g, and f1b) so as to satisfy Expression 1 or 2 described above. Alternatively, instead of satisfying Expression 1 or 2 above, Expression 5 or 6 described above may be satisfied.

With the control section 19, Modification 2 enhances the effect of making not perceivable the beat phenomenon (making the frequency setting with a higher precision) in addition to the effect achieved in the embodiment described above. This accordingly leads to more improved display quality.

[Modification 3]

Figure 15:
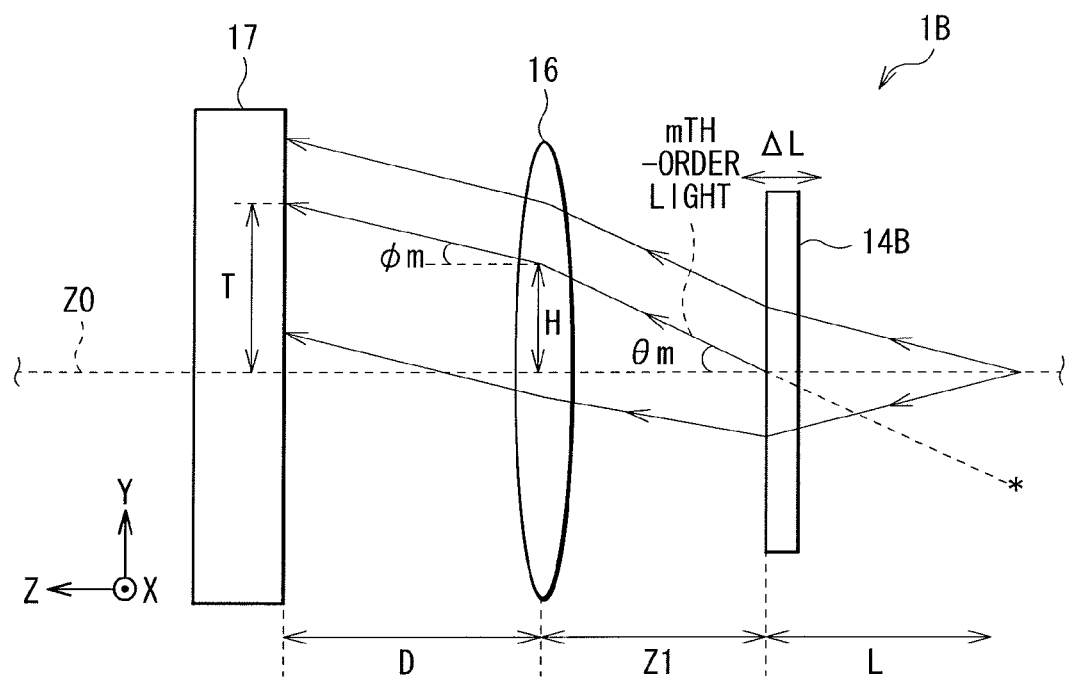
FIG. 15 is a diagram showing the configuration of a main part of an illumination device according to Modification 3.

FIG. 15 is a diagram showing the configuration of a main part (the partial configuration) of an illumination device (illumination device 1B) in Modification 3. In the illumination device 1B in Modification 3, as an alternative to the prism array 14 described in the embodiment and Modification 2 above, a diffraction element 14B that will be described later is provided as a specific example of the "optical element" of the present disclosure. The remaining configuration is similar to that of the illumination device 1.

As shown in FIG. 15, the diffraction element 14B is an optical element that diffracts incoming light into the collimator lens 16 and the fly-eye lens 17 before emission.

In Modification 3, the drive section 15 shifts the relative position between the diffraction element 14B and the fly-eye lens 17, thereby changing one or both of the incident position or angle of laser light in the incident surface of the fly-eye lens 17. To be specific, the drive section 15 shifts the relative position described above by vibrating (micro-vibrating) the diffraction element 14B along the direction (Z-axis direction) of the optical axis (optical axis Z0) of the diffraction element 14B and the fly-eye lens 17.

Thus, by the diffraction element 14B diffracting the incoming light (emitting the diffracted light), and by the drive section 15 vibrating the diffraction element 14B in the optical-axis direction, beam scanning is performed similarly to that in the embodiment described above. In other words, on the incident surface of the fly-eye lens 17, the beam scanning is performed by light coming from the diffraction element 14B. As a result, similarly to the embodiment described above, by multiplexing speckle patterns (time average), the occurrence of the speckle noise (interference pattern) resulted from the laser light is suppressed.

Also in Modification 3, the drive section 15 shifts the relative position between the diffraction element 14B and the fly-eye lens 17 (vibrates the diffraction element 14B itself in this example) so as to change one or both of the incident position or angle of laser light in the incident surface of the fly-eye lens 17. Accordingly, also in Modification 3, similarly to the embodiment described above, this reduces or avoids optical loss at the time of light incidence from the diffraction element 14B to the fly-eye lens 17 even if the relative position is shifted as above (even if the beam scanning operation is performed).

As shown in FIG. 15, the mth-order light (mth-order diffracted light) of the diffracted light coming from the diffraction element 14B is assumed to have the height (distance in the Y-axis direction) of H and T from the optical axis Z0 at the positions of the collimator lens 16 and the fly-eye lens 17, respectively. Also assuming that the mth-order light has the diffraction angle of θm, the distance between the diffraction element 14B and the collimator lens 16 is Z1, the distance between the collimator lens 16 and the fly-eye lens 17 is D, and the combined focal length of the collimator lens 16 is f (not shown), the following Expression 7 is established. Accordingly, assuming that the amplitude at the time when the diffraction element 14B is vibrating is ΔL, the amount of change ΔT of the height T on the fly-eye lens 17 is expressed by the following Expression 8. This means that, in this modification, the amplitude ΔL at the time of vibration may be so set that this amount of change ΔT falls within a range effective for the reduction of the speckle noise. The diffraction angle θm described above is expressed by the following Expression 9, where p denotes the pitch of a diffraction grating in the diffraction element 14B, and λ denotes the wavelength of incoming light. Accordingly, in Modification 3, assuming that the beam shift amount effective for the reduction of speckles on the fly-eye lens 17 is S, for the beam shift amount S, the following Expression 10 is established.

$$\begin{cases} T = \left(Z + D \times \dfrac{L}{f}\right)\tan\theta_m & (7) \\ \Delta T = \left(D \times \dfrac{\tan\theta_m}{f}\right)\Delta L & (8) \\ \theta_m = \sin^{-1}\left(\dfrac{m\lambda}{p}\right) & (9) \\ D \times \dfrac{\tan\theta_m}{f}\Delta L \geq S & (10) \end{cases}$$

Also with the illumination device 1B configured as such, and also with the display device using the illumination device 1B, the effect similar to the effect in the embodiment described above is achieved by similar function to that of the embodiment. To be specific, the occurrence of the interference pattern is suppressed (the display quality is improved) at the same time with the size reduction and the improved light use efficiency.

In Modification 3, exemplified is the case of using the diffraction element 14B as a specific example of the "optical element" the present disclosure, but this is surely not restrictive. The "optical element" can be not only a prism array, a diffraction element, a lens, and a lens array but also a diffusion element in some cases.

Also in Modification 3, similarly to Modification 2 described above, the control section 19 may be provided for dynamically controlling the frequency.

[Other Modifications]

While the present disclosure has been described in detail by referring to the embodiment and the modification, the present disclosure is not restrictive to the embodiment and others described above, and it is understood that various other modifications may be devised.

In the embodiment and others described above, the "optical element" of the present disclosure is exemplified by the prism array, the diffraction element, the lens, and the lens array. This is surely not restrictive, and any other optical elements may be used. Similarly, the "optical member" of the present disclosure is not restricted to the fly-eye lens exemplified in the embodiment and others described above, and any other optical members such as a rod integrator may be used.

Further, in the embodiment and others described above, exemplified is the case where the light source section intermittently emits laser light at the predetermined frequency f1 by intermittently irradiating laser light at emission frequency f1 by the laser light source. This is surely not restrictive, and alternatively, the light source section may be configured to emit laser light intermittently at the predetermined frequency f1 by blocking, in some way, the laser light coming from the laser light sources, or by using an acousto-optic modulator or an element utilizing the electrooptic effect, for example.

Still further, in the embodiment and others described above, exemplified is the case where the plurality of types of light sources (light sources for red, green, and blue) are each a laser light source. This is surely not restrictive, and one or more of the plurality of types of light sources may need to be a laser light source. It means that the light source section may be provided therein with a combination of a laser light source and any other type of light source, for example, LED.

Still further, in the embodiment and others described above, exemplified is the case where the light modulation element is a reflective liquid crystal element. This is surely not restrictive, and the light modulation element may be a transmissive liquid crystal element. Still alternatively, the light modulation element not being the liquid crystal element may also be used, for example, DMD (Digital Micromirror Device).

Still further, in the embodiment and others described above, exemplified is the case where the three types of light sources emitting light with different wavelengths are used. Alternatively, instead of using the three types of light sources, one, two, or four or more types of light sources may be used.

Still further, in the embodiment and others described above, the illumination device and the display device are described with the specific structure components (optical system) therein. However, those structure components are not necessarily all expected to be provided, or any other components may be additionally provided. To be specific, a dichroic mirror may be provided as alternatives to the dichroic prisms 131 and 132, for example.

Still further, in the embodiment and others described above, exemplified is the projection display device including the projection optical system (projection lens) for projecting, onto the screen, light modulated by the light modulation element. The present disclosure is applicable also to a direct-view display device, for example.

It is possible to achieve at least the following configurations from the above-described exemplary embodiments and the modifications of the disclosure.

(1) An illumination device, comprising:
a light source section including a laser light source, and intermittently emitting, at a predetermined frequency, laser light emitted from the laser light source;
an optical element passing the laser light emitted intermittently from the light source section; and
a drive section vibrating the optical element at a predetermined vibration frequency, wherein
an expression 1 or 2 below is satisfied, where f1 [Hz] denotes the frequency, f2 [Hz] denotes a variable frequency of luminance in illumination light emitted from the optical element as a result of vibration of the optical element, n1 denotes an arbitrary integer of 0 or larger and 10 or smaller, and n2 denotes a predetermined integer of 1 or larger.

$$|n1 \times f1 - f2| \geq 20 \qquad 1$$

$$|n2 \times f1 - f2| \leq 3 \qquad 2$$

(2) The illumination device according to (1), wherein
when the expression 1 is satisfied, an expression 3 below is also satisfied, where
f31 to f3M (M is an integer of 2 or larger) denote a spatial frequency in a luminance distribution of the illumination light emitted from the optical element when the optical element is not vibrating in order from a lowest frequency, and
A0 denotes a spatial amplitude in the luminance distribution of the illumination light when the optical element is vibrating.

$$(1/f32) \leq A0 \qquad 3$$

(3) The illumination device according to (1) or (2), wherein
the light source section emits the laser light of a plurality of types of wavelengths, and
the expression 1 or 2 is satisfied with the frequency of the laser light having at least a wavelength corresponding to a color having highest luminosity factor out of the plurality of types of wavelengths.
(4) The illumination device according to (3), wherein
the expression 1 or 2 is satisfied with the frequency of the laser light having at least wavelengths corresponding to colors having the highest and a second highest luminosity factors out of the plurality of types of wavelengths.
(5) The illumination device according to (4), wherein
the expression 1 or 2 is satisfied with the frequency of the laser light of all of the plurality of types of wavelengths.
(6) The illumination device according to any one of (1) to (5), wherein
the optical element includes a plurality of unit structures arranged along a vibration direction of the optical element, and $$f2 = (2 \times N \times f0) \text{ is satisfied, where}$$

f0 denotes the vibration frequency, and (an amplitude at a time of the vibration of the optical element/a pitch of the unit structures along the vibration direction)=N.
(7) The illumination device according to (6), comprising
a control section dynamically controlling both the vibration frequency and the frequency to satisfy the expression 1 or 2.
(8) The illumination device according to any one of (1) to (7), wherein
the expression 1 is satisfied when the n1 denotes an arbitrary integer of 0 or larger.
(9) The illumination device according to any one of (1) to (8), comprising an optical member emitting illumination light, wherein
the drive section changes one or both of an incident position and an incident angle of the laser light in an incident surface of the optical member by shifting a relative position between the optical element and the optical member.
(10) The illumination device according to (1) to (8), wherein
the optical element is an element allowing an incoming luminous flux to be split into two or more directions and to be emitted.
(11) The illumination device according to (9) or (10), wherein
the optical element is a prism array, a diffraction element, a lens, or a lens array.
(12) The illumination device according to any one of (9) to (11), wherein
the optical member is a fly-eye lens.
(13) The illumination device according to any one of (1) to (12), wherein
the laser light source intermittently emits the laser light at a predetermined emission frequency as the frequency.
(14) The illumination device according to any one of (1) to (13), wherein
the light source section includes three types of light sources each emitting red, green, or blue light.
(15) The illumination device according to (14), wherein
one or more of the three types of light sources are the laser light source.
(16) A display unit, comprising:
an illumination device emitting illumination light; and
a light modulation element modulating the illumination light based on a video signal, wherein
the illumination device includes
a light source section including a laser light source, and intermittently emitting, at a predetermined frequency, laser light emitted from the laser light source;
an optical element passing the laser light emitted intermittently from the light source section; and
a drive section vibrating the optical element at a predetermined vibration frequency, wherein
an expression 1 or 2 below is satisfied, where f1 [Hz] denotes the frequency, f2 [Hz] denotes a variable frequency of luminance in illumination light emitted from the optical element as a result of vibration of the optical element, n1 denotes an arbitrary integer of 0 or larger and 10 or smaller, and n2 denotes a predetermined integer of 1 or larger.

$$|n1 \times f1 - f2| \geq 20 \qquad 1$$

$$|n2 \times f1 - f2| \leq 3 \qquad 2$$

(17) The display unit according to (16), further comprising
a projection optical system projecting the illumination light modulated by the light modulation element onto a projection surface.
(18) The display unit according to (16) or (17), wherein
the light modulation element is a liquid crystal element.
It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. An illumination device, comprising:
a light source section including a laser light source, and intermittently emitting, at a predetermined frequency, laser light emitted from the laser light source;

an optical element passing the laser light emitted intermittently from the light source section; and
a drive section vibrating the optical element at a predetermined vibration frequency,
wherein the predetermined vibration frequency is set to be equal to a variable frequency of luminance in illumination light emitted from the optical element based on vibration of the optical element such that an expression 1 or 2 below is satisfied, where f1 [Hz] denotes the predetermined frequency, f2 [Hz] denotes the variable frequency of luminance, n1 denotes an arbitrary integer of 0 or larger and 10 or smaller, and n2 denotes a predetermined integer of 1 or larger;

$$|n1 \times f1 - f2| > 20 \text{ Hz} \qquad 1$$

$$|n2 \times f1 - f2| < 3 \text{ Hz} \qquad 2,$$

wherein when the expression 1 is satisfied, an expression 3 below is also satisfied,
where f31 to f3M (M is an integer of 2 or larger) denote a spatial frequency in a luminance distribution of the illumination light emitted from the optical element when the optical element is not vibrating in order from a lowest frequency, and A0 denotes a spatial amplitude in the luminance distribution of the illumination light when the optical element is vibrating;

$$(1/f32) \le A0 \qquad 3.$$

2. The illumination device according to claim 1, wherein the light source section emits the laser light of a plurality of types of wavelengths, and the expression 1 or 2 is satisfied with the predetermined frequency of the laser light having at least a wavelength corresponding to a color having highest luminosity factor among the plurality of types of wavelengths.

3. The illumination device according to claim 2, wherein the expression 1 or 2 is satisfied with the predetermined frequency of the laser light having at least wavelengths corresponding to colors having the highest and a second highest luminosity factors among the plurality of types of wavelengths.

4. The illumination device according to claim 3, wherein the expression 1 or 2 is satisfied with the predetermined frequency of the laser light corresponding to all the plurality of types of wavelengths.

5. The illumination device according to claim 1, wherein the optical element includes a plurality of unit structures arranged along a vibration direction of the optical element, and
f2=(2×N×f0) is satisfied, where f0 denotes the predetermined vibration frequency, and an amplitude at a time of the vibration of the optical element/a pitch of the plurality of unit structures along the vibration direction=N.

6. The illumination device according to claim 5, comprising a control section dynamically controlling the predetermined vibration frequency and the predetermined frequency to satisfy the expression 1 or 2.

7. The illumination device according to claim 1, wherein the expression 1 is satisfied when the n1 denotes an arbitrary integer of 0 or larger.

8. The illumination device according to claim 1, comprising an optical member emitting the illumination light, wherein the drive section changes one or both of an incident position and an incident angle of the laser light in an incident surface of the optical member by shifting a relative position between the optical element and the optical member.

9. The illumination device according to claim 1, wherein the optical element is an element allowing an incoming luminous flux to be split into two or more directions and to be emitted.

10. The illumination device according to claim 8, wherein the optical element is one of: a prism array, a diffraction element, a lens, or a lens array.

11. The illumination device according to claim 8, wherein the optical member is a fly-eye lens.

12. The illumination device according to claim 1, wherein the laser light source intermittently emits the laser light at a predetermined emission frequency as the predetermined frequency.

13. The illumination device according to claim 1, wherein the light source section includes three types of light sources, each of the light sources emitting red, green, or blue light.

14. The illumination device according to claim 13, wherein one or more of the three types of light sources are the laser light source.

15. A display unit, comprising:
an illumination device emitting illumination light; and
a light modulation element modulating the illumination light based on a video signal, wherein the illumination device includes:
a light source section including a laser light source, and intermittently emitting, at a predetermined frequency, laser light emitted from the laser light source;
an optical element passing the laser light emitted intermittently from the light source section; and
a drive section vibrating the optical element at a predetermined vibration frequency,
wherein the predetermined vibration frequency is set to be equal to a variable frequency of luminance in illumination light emitted from the optical element based on vibration of the optical element such that an expression 1 or 2 below is satisfied, where f1 [Hz] denotes the predetermined frequency, f2 [Hz] denotes the variable frequency of luminance, n1 denotes an arbitrary integer of 0 or larger and 10 or smaller, and n2 denotes a predetermined integer of 1 or larger;

$$|n1 \times f1 - f2| > 20 \text{ Hz} \qquad 1$$

$$|n2 \times f1 - f2| < 3 \text{ Hz} \qquad 2,$$

wherein when the expression 1 is satisfied, an expression 3 below is also satisfied,
where f31 to f3M (M is an integer of 2 or larger) denote a spatial frequency in a luminance distribution of the illumination light emitted from the optical element when the optical element is not vibrating in order from a lowest frequency, and A0 denotes a spatial amplitude in the luminance distribution of the illumination light when the optical element is vibrating;

$$(1/f32) \le A0 \qquad 3.$$

16. The display unit according to claim 15, further comprising a projection optical system projecting the illumination light modulated by the light modulation element onto a projection surface.

17. The display unit according to claim 15, wherein the light modulation element is a liquid crystal element.

18. An illumination device, comprising:
a light source section including a laser light source, and intermittently emitting, at a predetermined frequency, laser light emitted from the laser light source;
an optical element passing the laser light emitted intermittently from the light source section; and a drive section vibrating the optical element at a predetermined vibration frequency, wherein the predetermined vibration frequency is set to be equal to a variable frequency of luminance in illumination light emitted from the optical element based on vibration of the optical element such that an expression 1 or 2 below is satisfied, where f1 [Hz] denotes the predetermined frequency, f2 [Hz] denotes the variable frequency of luminance, n1 denotes an arbitrary integer of 0 or larger and 10 or smaller, and n2 denotes a predetermined integer of 1 or larger;

$$|n1 \times f1 - f2| \geq 20 \text{ Hz} \quad \quad 1$$

$$|n2 \times f1 - f2| \leq 3 \text{ Hz} \quad \quad 2,$$

wherein the light source section emits the laser light of a plurality of types of wavelengths, and the expression 1 or 2 is satisfied with the predetermined frequency of the laser light having at least wavelengths corresponding to colors having a highest luminosity factor among the plurality of types of wavelengths and a second highest luminosity factor among the plurality of types of wavelengths.

* * * * *